(12) United States Patent  
Zaccaria

(10) Patent No.: US 8,892,295 B2  
(45) Date of Patent: Nov. 18, 2014

(54) CONTROL AND MONITORING SYSTEM AND METHOD

(75) Inventor: Patrick Zaccaria, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 815 days.

(21) Appl. No.: 12/740,039

(22) PCT Filed: Oct. 24, 2008

(86) PCT No.: PCT/FR2008/001495  
§ 371 (c)(1),  
(2), (4) Date: Apr. 27, 2010

(87) PCT Pub. No.: WO2009/092872  
PCT Pub. Date: Jul. 30, 2009

(65) Prior Publication Data  
US 2010/0235001 A1    Sep. 16, 2010

(30) Foreign Application Priority Data

Oct. 31, 2007    (FR) ...................................... 07 07665

(51) Int. Cl.  
*G01M 17/00* (2006.01)  
*G06F 7/00* (2006.01)  
*G06F 11/30* (2006.01)  
*G06F 19/00* (2011.01)  
*G07C 5/00* (2006.01)  
*F02K 1/76* (2006.01)

(52) U.S. Cl.  
CPC ............... *F02K 1/763* (2013.01); *Y02T 50/671* (2013.01); *F05D 2270/62* (2013.01); *F05D 2270/54* (2013.01)

USPC ............ 701/29.1; 701/3; 701/109; 60/226.2; 60/230

(58) Field of Classification Search  
CPC ....... F02K 1/76; F02K 1/763; F05D 2270/54; F05D 2270/62  
USPC .................. 700/275, 286; 60/226.2, 221, 327, 60/39.281, 204; 701/3, 29.1, 109; 244/110 B, 199.1, 48, 78.1, 99.11, 54; 91/44, 166, 506; 239/265.19, 265.29, 239/265.35  
See application file for complete search history.

(56) References Cited

U.S. PATENT DOCUMENTS

| 3,086,360 | A |   | 4/1963 | Gavin |
|---|---|---|---|---|
| 3,321,921 | A |   | 5/1967 | Criffield |
| 4,391,409 | A | * | 7/1983 | Scholz ..................... 239/265.29 |

(Continued)

FOREIGN PATENT DOCUMENTS

| EP | 0 843 089 | 5/1998 |
|---|---|---|
| EP | 1 512 627 | 3/2005 |

(Continued)

*Primary Examiner* — Jason Holloway  
*Assistant Examiner* — Rachid Bendidi  
(74) *Attorney, Agent, or Firm* — Oblon, Spivak, McClelland, Maier & Neustadt, L.L.P.

(57) ABSTRACT

A monitoring system and a monitoring method applied to the monitoring system, in which the monitoring system includes detectors detecting a state of a turbojet thrust reverser, a monitoring computer device controlling the reverser monitored by the computer as a function of information from the detectors provided to the computer by way of the control device, and a device regulating the turbojet monitored by the computer as a function of the information from the detectors provided to the computer by way of the control device.

19 Claims, 2 Drawing Sheets

(56) References Cited

U.S. PATENT DOCUMENTS

Figure 1:
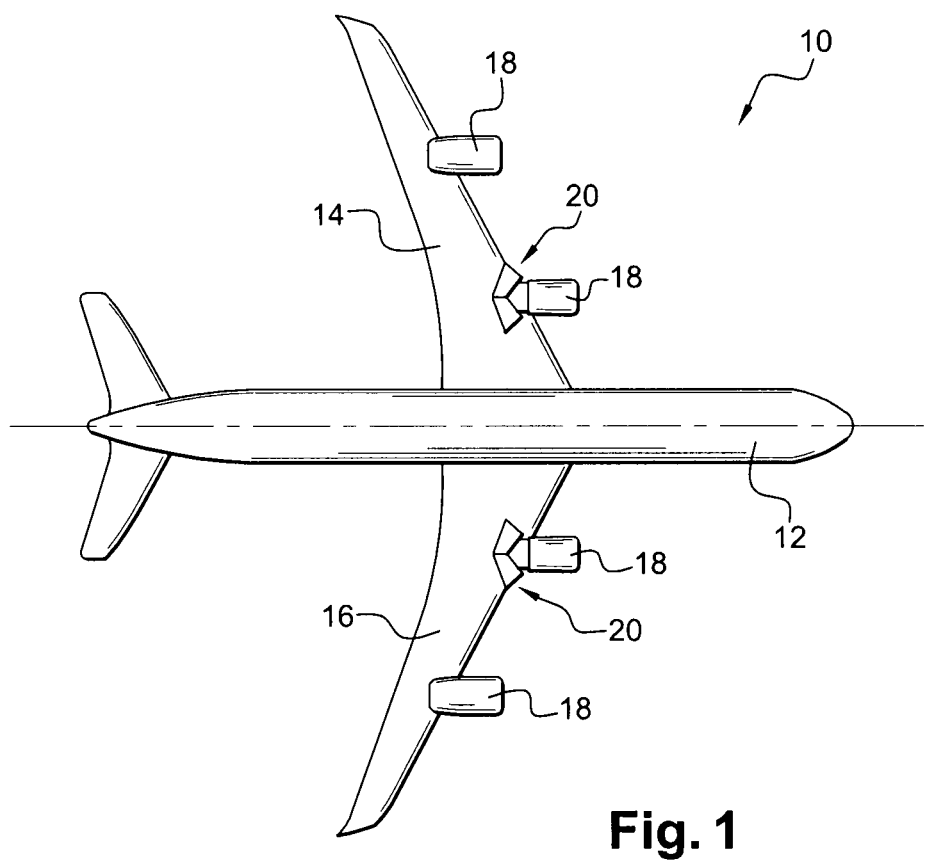

| | | | |
|---|---|---|---|
| 5,277,020 A * | 1/1994 | Dehu et al. | 60/803 |
| 5,960,626 A * | 10/1999 | Baudu et al. | 60/226.2 |
| 6,094,908 A * | 8/2000 | Baudu et al. | 60/226.2 |
| 6,519,929 B2 * | 2/2003 | Ahrendt | 60/226.2 |
| 6,564,541 B2 * | 5/2003 | Ahrendt | 60/204 |
| 6,622,474 B1 * | 9/2003 | Sternberger et al. | 60/226.2 |
| 6,684,623 B2 * | 2/2004 | Langston et al. | 60/226.2 |
| 7,278,257 B2 * | 10/2007 | Colotte et al. | 60/226.2 |
| 7,370,468 B2 * | 5/2008 | Colotte et al. | 60/226.2 |
| 7,920,973 B2 * | 4/2011 | Mollmann et al. | 702/56 |
| 7,954,759 B2 * | 6/2011 | Marin Martinod | 244/110 B |
| 8,151,550 B2 * | 4/2012 | Dehu et al. | 60/226.2 |
| 8,240,223 B2 * | 8/2012 | Jones et al. | 74/89.26 |
| 8,275,507 B2 * | 9/2012 | Bader et al. | 701/29.1 |
| 2003/0015982 A1 * | 1/2003 | Cox-Smith et al. | 318/433 |
| 2003/0101712 A1 * | 6/2003 | Johnson et al. | 60/226.2 |
| 2005/0116086 A1 | 6/2005 | Orazi | |
| 2006/0237598 A1 * | 10/2006 | Ferragut et al. | 248/74.1 |
| 2007/0236366 A1 * | 10/2007 | Gur et al. | 340/945 |
| 2007/0245746 A1 * | 10/2007 | Mollmann et al. | 60/779 |
| 2008/0149049 A1 * | 6/2008 | Mollmann et al. | 123/2 |
| 2010/0115915 A1 * | 5/2010 | Dehu et al. | 60/226.2 |

FOREIGN PATENT DOCUMENTS

| | | |
|---|---|---|
| GB | 2 408 725 | 6/2005 |
| WO | WO 02/103189 A1 | 12/2002 |
| WO | WO 2006/134253 | 12/2006 |

* cited by examiner

CONTROL AND MONITORING SYSTEM AND METHOD

The present invention relates to a control and monitoring system and a control and monitoring method, applied notably to a turbojet.

Numerous aircraft, notably those designed for civil transport, are fitted with thrust reversers for improving aircraft braking when landing. The thrust reverser is associated with the aircraft engines and is able to be commanded to change from a retracted inactive position to a deployed active position and, conversely, from the deployed active position to the inactive retracted position. In the deployed active position, a thrust reverser receives the jet from the associated engine and reverses the jet, allowing this to participate in aircraft braking.

Generally speaking, aircraft engines are fitted with a thrust reverser. Activation of the thrust reverser of an engine is initiated by the pilot using the control of the lever type, provided on the throttle lever for the relevant engine. It is only possible to activate this lever when the throttle lever is at a position corresponding to the engine operating at low speed.

EP-A-1 512 627 (U.S. Pat. No. 7,107,757) discloses an aircraft provided with a plurality of engines whose speeds are controlled individually, between idling and full speed, by throttles respectively associated with these engines. Certain engines of the plurality are equipped with thrust reversers that can be controlled so as to be able to go from an inactive retracted position to an active deployed position and, conversely, from the active deployed position to the inactive retracted position; the other engines are devoid of thrust reversers. A safety device is provided so as to disable, at least beyond a position corresponding to idling, operation of the throttles corresponding to those engines devoid of thrust reversers, when the thrust reversers are controlled so as to go from their inactive retracted position to their active deployed position. That document does not describe how control of the turbojets including a thrust reverser is managed with respect to the state of the reverser.

EP-A-0,843,089 discloses an electric control system for a turbojet engine thrust reverser on an aircraft, the thrust reverser having at least one movable component movable between a retracted and a deployed position of the reverser. The system includes at least a set of electromechanical drive devices for moving the movable component between the retracted and deployed positions of the thrust reverser. The system also includes an electronic control unit for controlling the electromechanical drive devices, the unit being electrically connected to a turbojet electronic regulation system. The unit is designed to, firstly, translate movable component retraction and deployment commands issued by the electronic regulation system into command of sequences for the electromechanical drive devices and, secondly, to keep the electronic regulation system informed on the status of the drive devices and on the position of the movable components.

In this system, information from the sensors is supplied to the regulation system via the electronic control unit. The drawback here is that the unit and the turbojet regulation system need to be compatible, the regulation system requiring notably to follow any evolution of the electronic control unit, which complicates the control system.

There is consequently a need for a simpler control and monitoring system for use with a turbojet.

To achieve this aim, there is provided a control and monitoring system characterized in that it comprises
sensors for the status of a turbojet thrust reverser,
a control and monitoring computing means,
a control unit for the thrust reverser controlled by the computing means as a function of information from the sensors supplied to the computing means via the control unit, and
a turbojet regulating device controlled by the computing means as a function of information from the sensors supplied to the computing means via the control unit.

In one embodiment, the control and monitoring computing means are adapted to control the electrical power supply to the thrust reverser.

In one embodiment, the control and monitoring computing means includes units selected from the group comprising a unit for controlling electrical powering of the thrust reverser, a unit for controlling thrust reverser change of status, a unit for controlling turbojet regulation.

In one embodiment, the status sensors are adapted to supply information to the regulating device.

In one embodiment, the regulating device is adapted to supply turbojet operating information to the computing means.

An aircraft is also provided comprising:
at least one turbojet with a thrust reverser,
the system as described above, the system performing turbojet control and monitoring.

A method for control and monitoring in a turbojet using the system described above is also provided, including the steps of
transmitting information on the status of the thrust reverser by the status sensors to the computing means via the control unit,
using the computing means to control the control unit as a function of the information,
using the computing means to control the regulating device as a function of the information.

In one embodiment, the method further includes the step of controlling the electrical power supply of the thrust reverser using the computing means.

In a further embodiment, the method further includes the steps of:
transmitting thrust reverser status information by the status sensors to the regulating device,
using the regulating device to check for concordance between information received by the status sensors and an instruction received from the computing means.

In a further embodiment, the method further includes the step of using the regulating device to supply turbojet operational information to the computing means.

Further characteristics and advantages of the invention will become more clear from reading the detailed description which follows of some embodiments of the invention, provided solely by way of example and with reference to the attached drawings.

Figure 2:
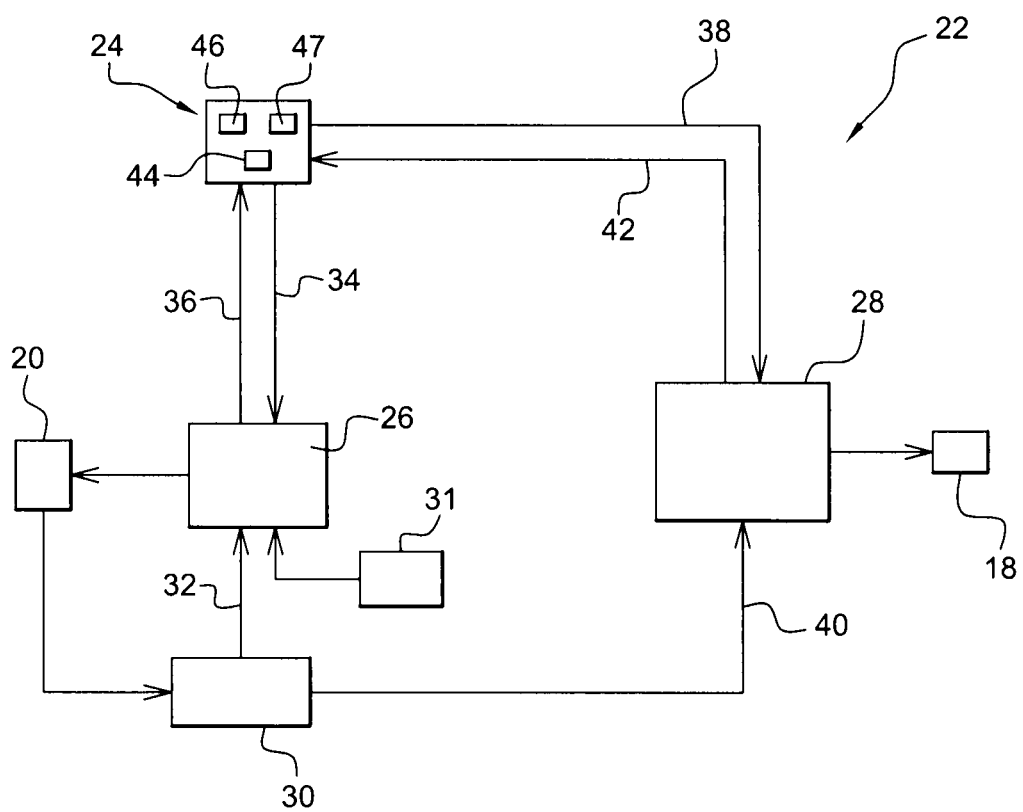

FIG. 1 is a diagrammatic view of an aircraft.
FIG. 2 is a block diagram of the control and monitoring system.

There is provided a control and monitoring system comprising turbojet thrust reverser status sensors and including control and monitoring computing means. The system also includes a control unit for the thrust reverser and a turbojet regulating device. The control unit is controlled by the computing means as a function of sensor information supplied to the computing means by the control unit. The regulating device is controlled by the computing means as a function of sensor information supplied to the computing means via the control unit. Thanks to this system, the control unit and the regulating device are not connected together. This avoids the need to make the control unit and the regulating device compatible with each other. This is advantageous when constructing or maintaining the system as each of them can be considered independently of the other. The system can be applied to a turbojet of an aircraft. The system is more simple.

FIG. 1 is a diagrammatic view of an aircraft 10 including fuselage 12 and two wings 14, 16, symmetrical with respect to fuselage 12. Turbojets 18 are mounted on each one of the wings 14, 16. FIG. 1 shows two turbojets 18 per wing solely by way of example. It can be envisaged to put one single turbojet 18 per wing.

At least one turbojet per wing is equipped with a thrust reverser 20. Thrust reverser 20 can change from a retracted inactive position to a deployed active position and vice versa. In the deployed active position, thrust reverser 20 receives the jet from the associated turbojet and reverses the jet, which allows thrust reverser 20 to participate in aircraft braking. By way of example, thrust reverser 20 is in the form of a tilting door type thrust reverser, but it could have a different structure. The thrust reversers 20 are shown in the deployed position on FIG. 1.

Each thrust reverser 20 is operated by drive members not shown on the drawing. The drive members can comprise an electric linear actuator, which may be irreversible, and at least one electric lock for retaining the door, referred to as the primary lock. The linear actuator can be operated by an electric motor, controlled by the control unit 26.

FIG. 2 is a block diagram of a control and monitoring system 22. This system 22 can control one or several turbojets. Turbojet control can include control of several turbojet operating parameters including power regulation of the turbojet but also control of the movement of the thrust reverser 20. More specifically, control and monitoring system 22 makes it, for example, possible to manage turbojet power as a function of the position of thrust reverser 20, thereby making it possible to avoid dangerous piloting situations for which the turbojet could be at maximum power while thrust reverser 20 is in the process of changing position. Below, system 22 will be described in relation with one single turbojet, but control and monitoring of more than one turbojet can be envisaged.

According to FIG. 2, control and monitoring system 22 can include control and monitoring computing means 24. Control and monitoring system 22 can also include a control unit 26 for controlling the thrust reverser 20 of turbojet 18 and a device 28 for regulating turbojet 18. Control and monitoring system 22 further includes sensors 30 for the status of the thrust reverser 20. System 22 will include as many control units 26 and regulating devices 28 as there are turbojets with a thrust reverser on the aircraft.

Sensors 30 make it possible to detect the position of thrust reverser 20 or, more generally, to sense the status of thrust reverser 20. Each thrust reverser 20 is provided with sensors 30 for sensing the status of the associated thrust reverser 20. The sensors 30 can be proximity or position sensors. The information from the sensors 30 can concern a deployed or a retracted state of the thrust reverser. The information from the sensors can also concern a change of status which is in progress. The information from the sensors is processed by the control and monitoring computing means 24. Other sensors 31 can supply information to control unit 26 which can then optionally be transmitted to the computing means 24. These can for example be sensors on the locking means.

One control and monitoring computing means 24 can be provided per engine. The control and monitoring computing means 24 can also be arranged to control all the turbojets of the aircraft. Thus, one single computing means 24 is provided in the aircraft for controlling all the turbojets 18. The control and monitoring computing means 24 can be located in the cockpit of the aircraft and control the turbojets 18 in a centralized fashion. The value of having a computing means at aircraft systems level is that instructions sent out are compiled on the basis of information of different natures, regardless of instructions from the pilot, the flight status of the aircraft and information concerning thrust reverser status. The computing means 24 can include a plurality of units for performing the various functions of the computing means 24. One unit 44 can fulfill the function of controlling change of status of the thrust reverser. Another unit 46 can fulfill the function of controlling power supply to the thrust reversers. A further unit 47 can fulfill the function of controlling turbojet regulation. The value of having several units is that of meeting safety objectives to ensure non-deployment of a thrust reverser outside of its operating range.

The control unit 26 makes it possible to control thrust reverser 20. In particular, control unit 26 makes it possible to control changes in position of thrust reverser 20. The control unit 26 controls change of status of thrust reverser 20, in other words change from the inactive retracted status to the active deployed status, and vice versa. Preferably, one control unit 26 is associated with each thrust reverser 20; control unit 26 is located in the aircraft wing, in proximity to the associated thrust reverser. Control unit 26 receives information from the sensors 30 of thrust reverser 20. This information concerns the status of thrust reverser 20; this can be a deployed or retracted status of reverser 20, but just as well the fact that thrust reverser 20 is in the process of changing state. On FIG. 2, arrow 32 shows the circulation of information from the sensors 30 to control unit 26. The information from the sensors 30 is centralized at control unit 26. This information is then relayed by the control unit 26 to the control and monitoring computing means 24. On FIG. 2, this transmission of information from control unit 26 to control and monitoring computing means 24 is indicated by arrow 36. Thus, the information from the sensors is directly transmitted to control and monitoring computing means 24 by control unit 26. This provides the advantage of faster transmission of information supplied by the sensors 30 right up to control and monitoring computing means 24. The fact of the information from the sensors being supplied directly by control unit 26 to the control and monitoring computing means 24, without passing via regulating device 28, also permits simplification of regulating device 28. In effect, it is possible to reduce the number of algorithms present in regulating device 28 since regulating device 28 no longer performs a function of relaying information between control unit 26 and control and monitoring computing means 24. Input data for the algorithms is located at aircraft/cell level and will be directly processed by control and monitoring computing means 24. This also makes for simplification of the connection arrangements for data transmission and simplification of the control and monitoring architecture.

Control unit 26 is controlled by control and monitoring computing means 24. Control and monitoring computing means 24 sends instructions to control unit 26 for the latter to control the movement of thrust reverser 20. In particular, control and monitoring computing means 24 detects the pilot's intention to initiate change of status of thrust reverser 20. Control and monitoring computing means 24 then initiates change of status of thrust reverser 20 via control unit 26. Arrow 34 in FIG. 2 indicates instructions sent by control and monitoring computing means 24 to control unit 26. Computing means 24 combines actions on the part of the pilot with information originating from the sensors 30 in order to formulate an instruction sent to control unit 26. This means that an instruction sent by computing means 24 is established knowing the position of the thrust reverser, which makes for aircraft piloting safety. The instruction sent to control unit 26 will typically be to initiate deployment or retraction of thrust reverser 20. Once the instruction is received, control unit 26 transforms the instruction into a control sequence. This control sequence is a series of signals that can be decoded by the thrust reverser operating members and locks. For example, control unit 26 sends speed control information to the electric motor operating the thrust reverser door linear actuator.

It can also be envisaged to have control unit 26 check that the instruction received from computing means 24 is effectively in concordance with information received from sensors 30. This provides supplementary safety measures.

In such an architecture, control unit 26 is directly interfaced with control and monitoring computer 24. In other words, control unit 26 is fully in communication with control and monitoring computing means 24. Regulating device 28 no longer intervenes between control unit 26 and control and monitoring computer 24; it is the computing means 24 that have authority over control unit 26. Unlike the disclosure in EP-A-0,843,089 which is a reflection of a natural tendency to have the instructions from computing means 24 go via turbojet regulating device 28 in view of the geographic proximity of regulating device 28 to control unit 26, the present architecture is no longer restricted by the integration and compatibility of these two devices. This notably simplifies manufacture and maintenance of control unit 26 and regulating device 28, as each of them can be considered independently of the other.

A further advantage is that criticality applying to control unit 26 can be reduced. In other words, as control unit 26 is subordinate to control and monitoring computing means 24 without any intermediary, control unit 26 is now directly under the control of computing means 24. This means that control and monitoring by computing means 24 of the actions of control unit 26 is tighter, making for a reduction in autonomy requirements for control unit 26. As a consequence, control unit 26 can be a less costly component, through its reduced level of performance.

Also, as a result of no longer being bound by the presence of regulating device 28 as an intermediary between control unit 26 and control and monitoring computing means 24, any deterioration of the system can be detected more rapidly. In effect, a degraded state of control unit 26, of the thrust reverser or of an operating member is detected more rapidly by computing means 24. Responsibility for detecting system deterioration is no longer supported by regulating device 28 which, once again, facilitates manufacture and maintenance thereof.

Turbojet regulation is performed by regulating device 28. In other words, regulating device 28 acts on the turbojet to modify the power thereof. Regulating device 28 can be a FADEC (Full Authority Digital Engine Control). Preferably, one regulating device 28 is associated with each turbojet. The output signals from regulating device 28 are appropriate for controlling turbojet power.

Regulating device 28 takes account of information from the sensors 30 and information from computing means 24 to modify turbojet power. Control and monitoring computing means 24 sends instructions to regulating device 28 for the latter to regulate turbojet power. Control and monitoring computing means 24 then initiates turbojet power modification via regulating device 28. Arrow 38 in FIG. 2 indicates the instructions sent by control and monitoring computing means 24 to regulating device 28. More precisely, the computing means 24 controls the regulating device, taking account of information from the sensors supplied to the computing means 24 by control unit 26. The computing means 24 process actions on the part of the pilot and information originating from the sensors 30 in order to formulate an instruction sent to regulating device 28. This makes it possible to regulate turbojet power as a function of position of thrust reverser 20. In effect, it must for instance not be possible for regulating device 28 to impose maximum power on the turbojet if thrust reverser 20 is in the process of changing position. This would result in a risk of damaging thrust reverser 20. The turbojet is, on the contrary, set to low power during transition phases of the thrust reversers 20. Thus, control from computing means 24 is established in knowledge of the position of thrust reverser 20, which makes for piloting safety of the aircraft.

In such an architecture, regulating device 28 is directly interfaced with control and monitoring computing means 24 for turbojet regulation. Control unit 26 and regulating device 28 are controlled in parallel, in other words on different links. Regulating device 28 does not receive information directly from control unit 26. Control unit 26 and regulating device 28 are not mutually in full communication. Regulating device 28 is outside of the link between computing means 24 and control unit 26. This means that one is no longer bound by the necessity of applying the same standards and communication protocols to control unit 26 and regulating device 28. One can now change or modify a standard or a communication protocol solely on one of control unit 26 and regulating device 28.

In such an architecture, one can reduce criticality applying to regulating device 28. In other words, as regulating device 28 is no longer controlling control unit 26, the function of controlling control unit 26 is assigned to computing means 24. This makes for a reduction in authority and autonomy requirements applying to regulating device 28, as regards thrust reverser operation. As a consequence, regulating device 28 can be a component with fewer inputs/outputs, from a hardware point of view.

It can also be envisaged for regulating device 28 to receive information from the thrust reverser status sensors 30. Arrow 40 in FIG. 2 shows this diagrammatically. In this way, regulating device 28 can check concordance between instructions received from control and monitoring computing means 24 and thrust reverser status. This offers an additional safety measure.

Regulating device 28 can send turbojet operating information to the control and monitoring computing means 24. Arrow 42 in FIG. 2 depicts this. The information supplied by regulating device 28 is, for example, information concerning turbojet operating speed or temperature, or failures or any dysfunctions of the turbojet. This gives computing means 24 better knowledge of turbojet operation, thereby favoring control of operation.

The various components of the system 22 can for instance be connected together by an AFDX (Avionics Full Duplex) network. This is a redundant Ethernet network with enhanced reliability designed to act as an internal communications media for the aircraft. In order to satisfy system network availability needs, an AFDX network is physically redundant: each component of system 22 sends messages on two different channels. This reduces transmission failures, and problems associated with hardware faults.

Control and monitoring computing means 24 can provide for synchronization of thrust reverser movements. Synchronization is favored by the use of the computing means 24 which will have the same algorithms per motor with its own inputs.

Apart from the primary lock discussed above, system 22 can include one or several other locks providing enhanced aircraft safety measures. By way of a secondary lock, system 22 can include a brake applied to the thrust reverser operating members. The brake can for example be applied to the electric motor driving the thrust reverser actuator, or to the actuator itself. This secondary lock is designed to support the thrust reverser door should the primary lock fail. The secondary lock can be controlled by control unit 26. Independently of the presence of the secondary lock, system 22 can include a tertiary lock which can retain the door should the other locks fail. This tertiary lock is controlled directly from the cockpit. Direct control of the tertiary lock can be via a thrust reversal lever. The tertiary lock can also be controlled by computing means other than computing means 24. These other computing means can operate dependent on the thrust reversal lever and on aircraft flight parameters. Sensors are able to supply information regarding the status of these locks.

System 22 can also control electrical power distribution to the various components of the system. Shutting off the power supply is advantageous for avoiding, for instance, untoward deployment of the thrust reversers, notably in flight, which would have highly dangerous consequences. Shutting off power supply is a supplementary safety measure. The control and monitoring computing means 24 can manage the electrical power supply to the thrust reverser 20 and in particular to its operating members, (for instance, the electric motor operating the linear actuator) of thrust reverser 20. The computing means 24 are in a position to apply or to shut off electrical power to the thrust reverser 20 operating members. Shutting off of electrical power to the operating members can be done directly by the control and monitoring computing means 24 via control unit 26. The control and monitoring computing means 24 can also manage the electrical power supply to control unit 26; in particular, the computing means 24 can cut off the electrical power supply to the control unit 26 if the latter is behaving abnormally.

A method for control and monitoring in a turbojet using the control and monitoring system 22 can include transmission of information on the status of thrust reverser 20 by the sensors 30 to the computing means 24, via the control unit 26. The method can then include controlling and monitoring control unit 26 by the computing means 24 on the basis of such information, and then controlling regulating device 28 using the computing means 24 dependent on this information. In the method, control of each of control unit 26 and regulating device 28 is in parallel; only computing means 24 has authority over one or the other of control unit 26 or regulating device 28. The advantages discussed above apply here.

We shall now describe one example of operation. This concerns deployment of the thrust reverser; thrust reverser retraction being able to operate along the same lines. Firstly, and if necessary, the third lock is unlocked. As soon as unlocking is effective, the sensors associated with the tertiary lock inform the computing means 24, optionally via control unit 26. A first series of events can now take place at the computing means 24. Computing means 24 (or more particularly unit 46 thereof) initiates powering of the operating members, in particular the actuator operating motor, optionally via the control unit 26. Once powering up of the operating members is effective, the computing means 24 (or in particular unit 44 thereof) sends a deployment instruction to control unit 26. Following this, a second series of events can take place at control unit 26. Upon receiving the instruction from the computing means 24, control unit 26 commands unlocking of the secondary lock. As soon as the sensors associated with the secondary lock detect effective unlocking of the secondary lock, an item of information is transmitted to control unit 26. Upon receiving this information, control unit 26 unlocks the primary lock. As soon as the sensors associated with the primary lock detect that unlocking of the primary lock is in effect, an item of information is transmitted to control unit 26. Upon receiving this information, control unit 26 commands opening of the thrust reverser door by operating the actuator drive motor. As soon as the sensors 30 for thrust reverser status detect that the door is open, an item of information is transmitted to control unit 26. This piece of information is passed on to the computing means 24. The computing means 24 can shut off electrical powering. Shutting off electrical power brings about locking of the thrust reverser doors and reversed jet. The computing means 24 can then send an instruction to regulating device 28 in order to modify turbojet power. Regulating device 28 can trigger acceleration of the turbojet in order to accentuate aircraft braking. It can also be envisaged for information on thrust reverser door opening to be directly transmitted to regulating device 28 which is in a position to compare such information with the instruction received from the computing means 24.

In the above, the sensors mentioned can not only be in a position to give information about the final status of events, but also be in a position to give information regarding the state of advancement of these events. This makes for better control of thrust reverser door deployment. Also, either all the information from the sensors or only a part thereof can be relayed to the computing means; notably, information on the status of the secondary and tertiary locks can be relayed to the computing means while information regarding the primary lock status remains at control unit level. This reduces hardware overhead in terms of inputs/outputs.

The invention claimed is:

1. A control and monitoring system comprising:
sensors configured to sense status of a turbojet thrust reverser;
a control and monitoring computing computer;
a control unit configured to control the thrust reverser, the control unit being controlled by the control and monitoring computing computer as a function of information from the sensors supplied to the control and monitoring computing computer via the control unit; and
a turbojet regulating device, the turbojet regulating device being controlled by the control and monitoring computing computer as a function of information from the sensors supplied to the control and monitoring computing computer via the control unit,
wherein the control and monitoring computing computer and the control unit are electrically directly connected, the sensors are electrically directly connected to the control unit and the turbojet regulating device, the turbojet regulating device is electrically directly connected to the control and monitoring computing computer, and the control unit and the turbojet regulating device are not electrically connected together.

2. The system according to claim 1, wherein the control and monitoring computing computer is configured to control the electrical power supply to the thrust reverser.

3. The system according to claim 1, wherein the control and monitoring computing computer includes units selected from the group consisting of: a first unit configured to control electrical powering of the thrust reverser; a second unit configured to control thrust reverser change of status; and a third unit configured to control the turbojet regulating device.

4. The system according to claim 1, wherein the status sensors are configured to supply information to the turbojet regulating device.

5. The system according to claim 1, wherein the turbojet regulating device is configured to supply turbojet operating information to the control and monitoring computing computer.

6. The system according to claim 1, wherein the control and monitoring computing computer is located in a cockpit of an aircraft comprised of the control and monitoring system.

7. The control and monitoring system according to claim 1, wherein the status sensors send thrust reverser status information to the control and monitoring computing computer via the control unit.

8. An aircraft comprising:
at least one turbojet with a thrust reverser;
a control and monitoring system comprising:
sensors configured to sense status of the thrust reverser,
a control and monitoring computing computer,
a control unit configured to control the thrust reverser, the control unit being controlled by the control and monitoring computing computer as a function of information from the sensors supplied to the control and monitoring computing computer via the control unit, and
a turbojet regulating device, the turbojet regulating device being controlled by the control and monitoring computing computer as a function of information from the sensors supplied to the control and monitoring computing computer via the control unit; and
the system is configured to perform turbojet control and monitoring,
wherein the control and monitoring computing computer and the control unit are directly interfaced with each other, the sensors are electrically directly connected to the control unit and the turbojet regulating device, the turbojet regulating device is directly interfaced with the control and monitoring computing computer, and the control unit and the turbojet regulating device are neither electrically directly connected together nor electrically directly interfaced with each other.

9. The aircraft according to claim 8, wherein the control and monitoring computing computer is configured to control the electrical power supply to the thrust reverser.

10. The aircraft according to claim 8, wherein the control and monitoring computing computer includes units selected from the group consisting of: a first unit configured to control electrical powering of the thrust reverser; a second unit configured to control thrust reverser change of status; and a third unit configured to control the turbojet regulating device.

11. The aircraft according to claim 8, wherein the status sensors are configured to supply information to the turbojet regulating device.

12. The aircraft according to claim 8, wherein the turbojet regulating device is configured to supply turbojet operating information to the control and monitoring computing computer.

13. The aircraft according to claim 8, wherein turbojet thrust reverser status data from the sensors is supplied to the control and monitoring computing computer via the control unit without passing through the turbojet regulating device.

14. A method for control and monitoring in a turbojet using a control and monitoring system comprising:
sensors configured to sense status of a thrust reverser,
a control and monitoring computing computer,
a control unit configured to control the thrust reverser, the control unit being controlled by the control and monitoring computing computer as a function of information from the sensors supplied to the control and monitoring computing computer via the control unit,
a turbojet regulating device, the turbojet regulating device being controlled by the control and monitoring computing computer as a function of information from the sensors supplied to the control and monitoring computing computer via the control unit,
wherein the control and monitoring computing computer and the control circuitry unit are electrically directly interfaced with each other, the sensors are electrically directly connected to the control unit and the turbojet regulating device, the turbojet regulating device is electrically directly interfaced with the control and monitoring computing computer, and the control unit and the turbojet regulating device are not electrically interfaced with each other, and
wherein the method comprises:
transmitting thrust reverser status information from the status sensors to the control and monitoring computing computer via the control unit;
using the control and monitoring computing computer to control the control unit as a function of the status information; and
using the control and monitoring computing computer to control the turbojet regulating device as a function of the status information.

15. The aircraft according to claim 8, wherein the status sensors send thrust reverser status information to the control and monitoring computing computer via the control unit.

16. The method according to claim 14, wherein turbojet thrust reverser status data from the sensors is supplied to the control and monitoring computing computer via the control unit without passing through the turbojet regulating device.

17. The method according to claim 14, further comprising:
controlling the electrical power supply of the thrust reverser using the control and monitoring computing computer.

18. The method according to claim 14, further comprising:
transmitting thrust reverser status information by the status sensors to the turbojet regulating device; and
using the turbojet regulating device to check for concordance between information received by the status sensors and an instruction received from the control and monitoring computing computer.

19. The method according to claim 14, further comprising:
using the turbojet regulating device to supply turbojet operating information to the control and monitoring computing computer.

* * * * *